United States Patent [19]

Winston

[11] 4,230,095
[45] Oct. 28, 1980

[54] IDEAL LIGHT CONCENTRATORS WITH REFLECTOR GAPS

[75] Inventor: Roland Winston, Chicago, Ill.

[73] Assignee: The United States of America as represented by the United States Department of Energy, Washington, D.C.

[21] Appl. No.: 909,864

[22] Filed: May 26, 1978

[51] Int. Cl.³ ................................................. F24J 3/02
[52] U.S. Cl. .................................. 126/439; 126/438; 126/443; 350/293; 136/246
[58] Field of Search ................ 126/270, 271, 438, 439, 126/443; 350/288, 292, 294, 293, 303; 136/89 PC

[56] References Cited

U.S. PATENT DOCUMENTS

| | | | |
|---|---|---|---|
| 3,923,381 | 12/1975 | Winston | 126/271 |
| 3,991,740 | 11/1976 | Rabl | 126/271 |
| 4,002,499 | 1/1977 | Winston | 126/271 |
| 4,088,116 | 5/1978 | Pastor | 126/271 X |
| 4,099,515 | 7/1978 | Schertz | 126/271 |
| 4,114,592 | 9/1978 | Winston | 126/439 |
| 4,130,107 | 12/1978 | Rabl et al. | 126/438 |
| 4,134,392 | 1/1979 | Livermore et al. | 126/439 |

OTHER PUBLICATIONS

*Applied Optics,* vol. 15, No. 2, Feb. 1976, pp. 291, 292, Winston, R., "Dielectric Compound Parabolic Concentrators".

"The Collection of Diffuse Light onto an Extended Absorber", I. M. Bassett and G. H. Derrick, Optical and Quantum Electronics 10 (1978) pp. 61–82.

*Primary Examiner*—James C. Yeung
*Assistant Examiner*—Larry Jones
*Attorney, Agent, or Firm*—James E. Denny; Frank H. Jackson; Paul A. Gottlieb

[57] ABSTRACT

A cylindrical or trough-like radiant energy concentration and collection device is provided. The device includes an energy absorber, a glazing enveloping the absorber and a reflective wall. The ideal contour of the reflective wall is determined with reference to a virtual absorber and not the actual absorber cross section.

5 Claims, 4 Drawing Figures

IDEAL LIGHT CONCENTRATORS WITH REFLECTOR GAPS

CONTRACTURAL ORIGIN OF THE INVENTION

The invention described herein was made in the course of, or under, a contract with the UNITED STATES DEPARTMENT OF ENERGY.

BACKGROUND OF THE INVENTION

The present invention relates generally to the collection of radiant energy of solar origin. A particular type of solar energy concentration and collection device is a cylindrical or trough-shaped collector comprised of an energy absorber and one or two opposing reflective side walls. The collector is formed by extending the transverse cross sections of the absorber and the reflective wall or walls longitudinally, parallel to an axis, to form the trough-like structure. There has been determined the "ideal side wall contour" to achieve maximum concentration of energy incident on the entrance aperture onto the surface of the absorber. The factors which determine ideal side wall contour are the angle of the extreme rays from the radiant energy source, the cross section of the absorber, and the desired maximum angle of incidence less than or equal to 90 degrees of concentrated energy on the surface of the absorber. For energy from an infinite source and for the collection of diffuse radiation, the extreme rays are all equal to a specified acceptance angle selected by the designer and are therefore parallel to each other. For rays from a source of finite dimension and distance from the collector, the extreme rays are those rays generated by the edge points of the source.

U.S. Pat. No. 3,923,381 describes the ideal side wall contour for concentrating energy from an infinite source onto the top surface of a flat energy absorber. U.S. Pat. No. 4,002,499 describes the ideal side wall contour for concentrating energy from an infinite source onto nonflat energy absorbers and onto both sides of flat energy absorbers. U.S. Pat. No. 3,957,031 describes the ideal side wall contour for concentrating energy from a finite source onto an energy absorber of arbitrary shape. U.S. Pat. No. 4,130,107 gives the ideal side wall contour for concentrating energy from an infinite or finite source onto an energy absorber of arbitrary shape wherein the maximum angle of incidence of energy concentrated onto the surface of the energy absorber is restricted to a particular value less than 90 degrees. U.S. Pat. No. 4,114,592 describes the ideal side wall contour for concentrating energy from an infinite or finite source onto an energy absorber of arbitrary shape wherein a refractive medium acts on the rays of incident energy prior to their being concentrated onto the energy absorber. A publication, Applied Optics, Vol. 15, No. 2, pages 291-292, Feb. 1976, describes concentration of radiant energy from an infinite or finite source onto the surface of an arbitrary energy absorber wherein the reflective wall is obtained by total internal reflection within the interface between a dielectric medium and the exterior environment. To the extent the above-cited references contain "essential" material necessary to support the claims hereof or indicate background, they are expressly incorporated by reference herein.

All the designs described above give an ideal contour wherein the side wall or walls terminate by touching the energy absorber. Each side wall includes, for full illumination of the receiver, an involute portion which touches the receiver and then a portion above the involute which directs incident extreme rays so that they intersect the surface of the receiver at a predetermined angle. For a two-walled collector the touching occurs at the cusp of collector wherein the two sides of the reflective walls meet with different slopes. Certain applications preclude the use of a reflective wall or walls which touch the absorber. For example, where the absorber is contained within a glazing to reduce conductive and convective heat loss, it has been determined that one possible technique is to truncate the ideal contour by not including any reflective wall within the glass tube, thereby creating a reflector gap from the full ideal contour. Another approach has been to use the glazing shape to determine the ideal contour rather than the absorber shape.

It is therefore an object of this invention to provide an improved trough-shaped radiant energy concentration and collection device.

Another object of this invention is to provide a concentration and collection device for radiant energy wherein the absorber upon which energy is to be concentrated is contained within a glazing.

SUMMARY OF THE INVENTION

A cylindrical radiant energy concentration and collection device is provided. The device includes an energy absorber which is contained within a glazing. The glazing, which is either evacuated or contains a gas, is intended to reduce convective and conductive losses from the absorber. One wall or two opposing reflective walls are provided for concentrating energy incident thereon onto the surface of the absorber through the glazing. The contour of these side walls is determined by rules for determining ideal side wall contour but determined with respect to a virtual absorber shape not being identical to the shape of the actual absorber. The virtual absorber and therefore the reflective wall or walls begin along the surface of the glazing.

DETAILED DESCRIPTION OF THE INVENTION

Figure 1:
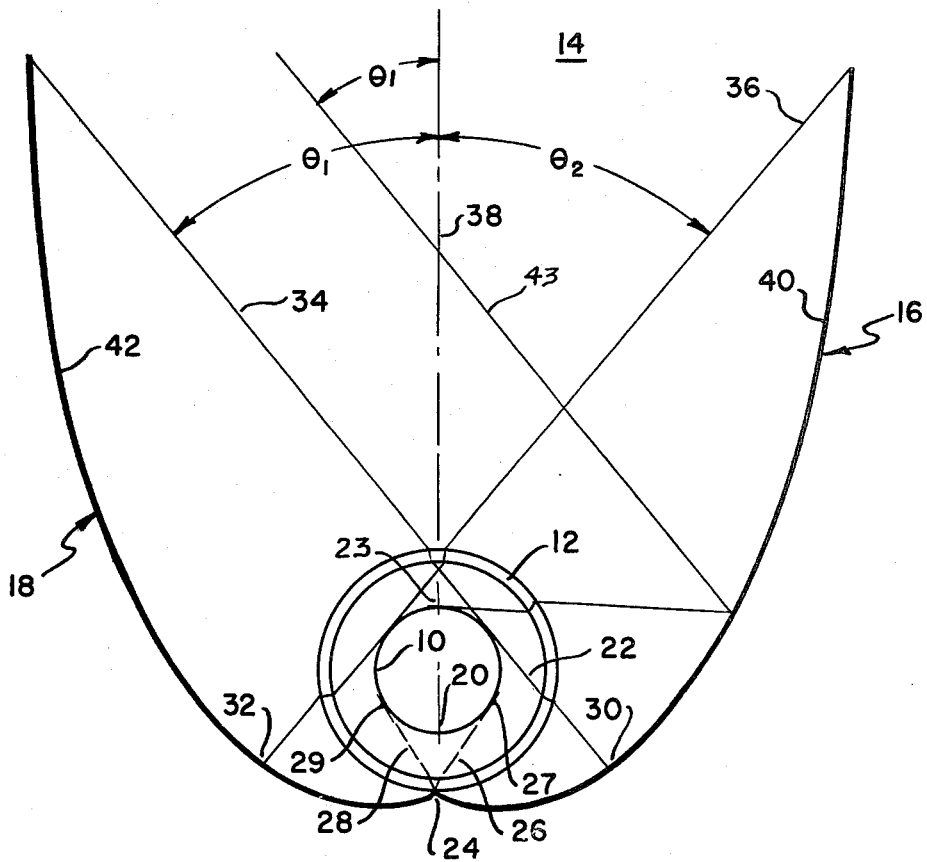
FIG. 1 is the transverse cross section of a two-walled radiant energy collection and concentration device.

Referring to FIG. 1, there is shown the transverse cross section of a cylindrical radiant energy collection and concentration device exhibiting improved concentration. The device includes an energy absorber 10 contained within a glazing 12, i.e. an envelope transparent to radiant energy to be collected. The energy absorber may be any device for utilizing incident radiant energy such as a coolant tube, photovoltaic device, heat pipe, etc. The glazing, which may be of glass or some other transparent material, may be evacuated or contain some gas, such as air. The glazing is intended to reduce conductive and convective losses from the surface of the energy absorber 10. Energy incident on entrance aperture 14 is directed through glazing 12 onto the surface of absorber 10 by a pair of opposing reflective walls 16 and 18. The ideal contour of walls 16 and 18 would be determined with reference to the shape of absorber 10 as described in the references previously referred to. According to those references, the ideal contour would begin on the surface of absorber 10, say at point 20. To provide the ideal contour according to the references, wherein the absorber is enveloped by a glazing 12, it would therefore be necessary to include a portion of the reflective side walls within the annular space 22 between glazing 12 and absorber 10. This is not very practical, increasing fabrication cost and assembly complexity. Prior art practice has modified the ideal contour either by permitting gaps in the ideal contour by eliminating the portion of the ideal contour within the glazing 12 or by determining the ideal contour with reference to the cross section of glazing 12 rather than absorber 10. In both cases, the reflectors start along the surface of glazing 12. There is herein provided a reflector design which preserves ideal flux concentration on the surface of absorber 10. For clarity, our initial discussion neglects refractive effects of the glazing. The contour herein provided starts the reflectors 16 and 18 at a point 24, at the closest permissible distance to absorber 10 along glazing 12. The contour of each reflector is then developed according to usual rules for determining ideal contour except that the rules are applied, not with respect to the actual cross section of absorber 10, but with respect to the cross section of a virtual absorber. Two lines 26 and 28 are drawn to represent rays tangent to absorber 10 originating from point 24. The cross section of the virtual absorber is defined by the area contained within absorber 10 and lines 26 and 28. Using the virtual absorber so defined, the ideal side wall contour for walls 16 and 18 is then generated according to usual rules laid out in previously incorporated references. The ideal contour for each wall 16 and 18 will be the involute of the virtual absorber from point 24 to points 30 and 32, respectively. Points 30 and 32 are determined by the intersection of shadow lines 34 and 36 with side walls 16 and 18, respectively. Each shadow line is drawn tangent to absorber 10, crossing the optic axis 38 at the angle of acceptance of the collector, i.e. maximum angle of incident energy to be collected. Note that shadow lines 34 and 36, to be completely ideal, are bent due to refraction by glazing 12. For wall 16, the maximum angle is $\phi_1$ and for wall 18 the maximum angle is $\phi_2$. $\phi_1$ and $\phi_2$ are arbitrarily selected for an infinite source and particularly defined for a finite source. Above points 30 and 32 the ideal contour portions 40 and 42 of walls 16 and 18, respectively, will follow the rule that extreme rays, i.e. rays which cross the optic axis 38 at angles $\phi_1$ and $\phi_2$ respectively, are directed to be incident on the surface of the virtual absorber at the particular angle of incidence selected for that particular collector which is less than or equal to 90 degrees. For example, ray 43 crosses axis 38 at angle $\phi_1$, and is reflected by wall 16 to be tangent to absorber 10 (i.e. angle of incidence = 90°) after refraction by glazing 12.

Figure 2:
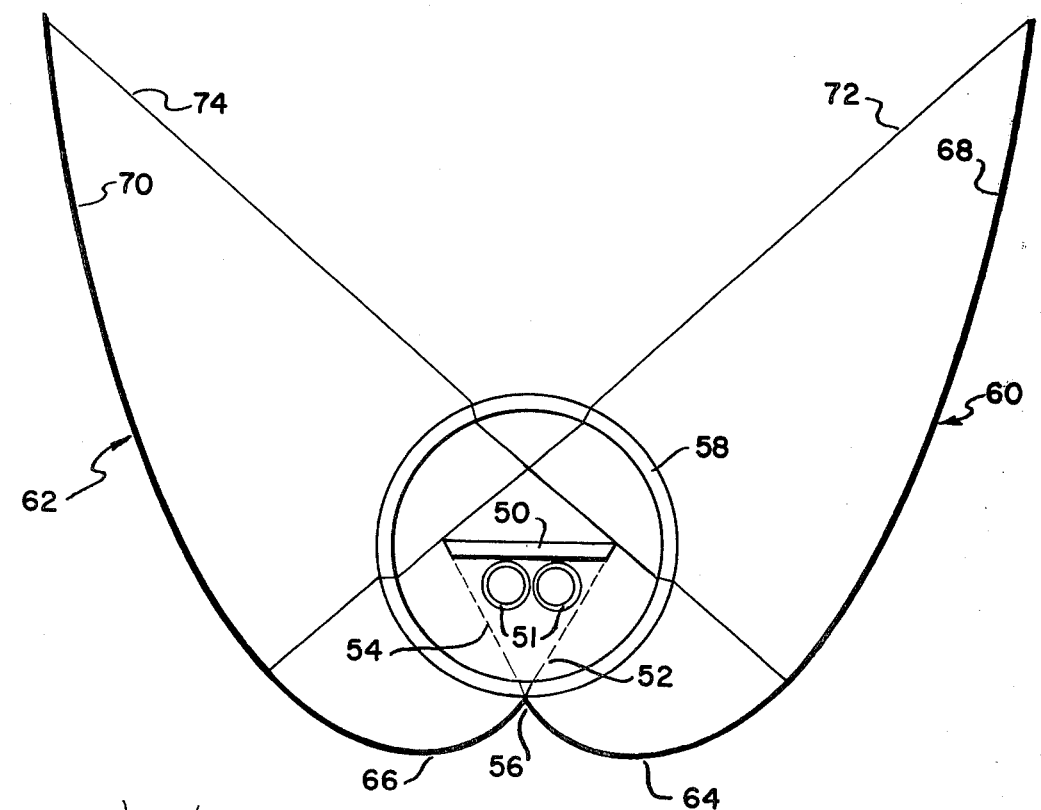
FIG. 2 is the transverse cross section of another embodiment of a two-walled collection device.

Referring to FIG. 2, there is shown an alternate embodiment wherein the absorber 50 is a flat surface. Pipes 51, through which is circulated a fluid, remove the heat absorbed by surface 50 and heat directed onto pipes 51 by walls 60 and 62. The pipes 51 are shown touching surface 50, but this need not be so. The absorber 50 determines the shape of the virtual absorber by drawing lines 52 and 54 from point 56 along the surface of glazing 58. The side wall contour of walls 60 and 62 is then determined according to the usual rules with respect to the virtual absorber defined by absorber 50, and lines 52 and 54 including involute portions 64 and 66 and upper portions 68 and 70 which extend from shadow lines 72 and 74.

Figure 3:
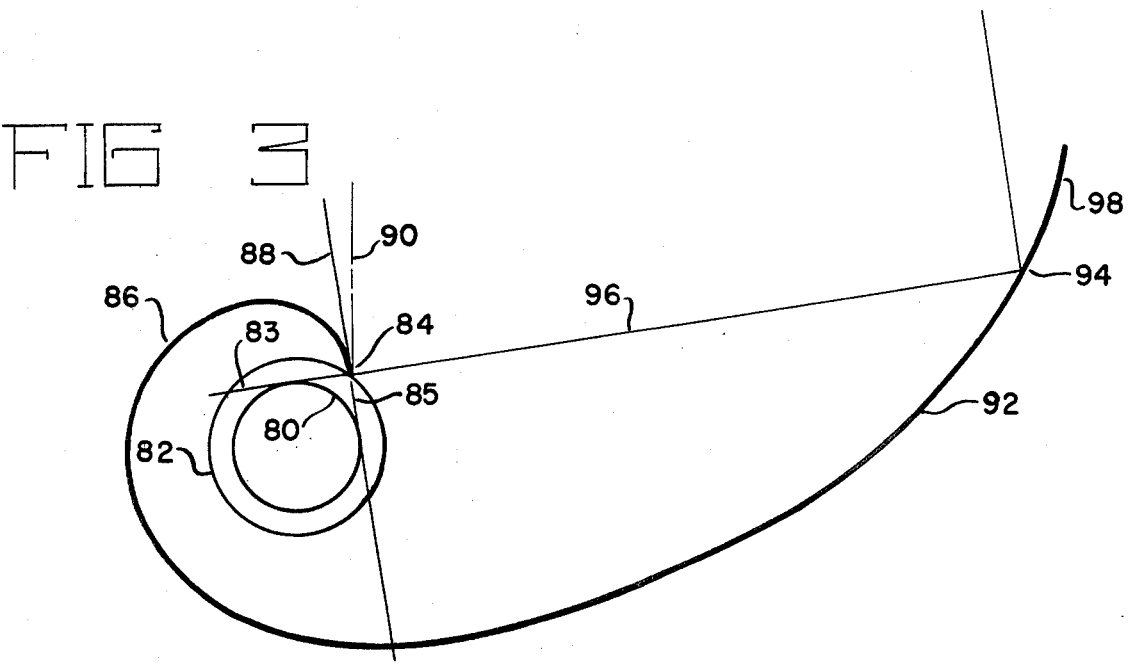
FIG. 3 is the transverse cross section of a one-walled radiant energy collection device.

U.S. Pat. No. 3,991,740 describes the ideal one-walled side wall contour wherein the energy absorber is flat. Referring to FIG. 3 there is shown the transverse cross section of a one-walled concentration and collection device. The device includes an absorber 80 contained within a glazing 82 (note in FIG. 3 glazing 82 is shown as a single line with no thickness). This is done to show that one can ignore the refraction of rays by the glazing in determining side wall contour, particularly if the glazing is thin. There are two preferred methods of constructing a one-walled device. One could follow the procedure enunciated for the embodiments of FIG. 1 and FIG. 2, i.e. (1) construct a virtual absorber by drawing two lines 83 and 85 tangent to the absorber 80 from a point 84 along the glazing, (2) from point 84 extending a reflective wall portion 86 which is the involute of the virtual absorber until portion 86 intersects shadow line 88 which crosses the optic axis 90 (a vertical line) at the maximum angle of acceptance; and (3) from line 88 extend another portion 92 of the reflective wall whose contour is determined by directing all incident extreme rays to point 84. Portion 92 is infinite and may be terminated at any desired location.

An alternative method of forming a desirable collector would determine the contour of portion 92 by directing all incident extreme rays to the surface of absorber 80 at the maximum angle of incidence and would terminate portion 92 at point 94 wherein line 96 from point 94 to point 84 is parallel to line 83. From point 94 extends portion 98 whose contour is defined so that all incident extreme rays are directed by portion 98 of the reflective wall to point 84. This reflector achieves the same results as the reflector previously described except with reduced reflector area. For optimum results one should insure that the involute begins at a point 84 where it will not shade absorber 80 from direct incoming extreme rays. Thus, involute 86 may begin along the extension of line 85 but may not cross line 85.

Figure 4:
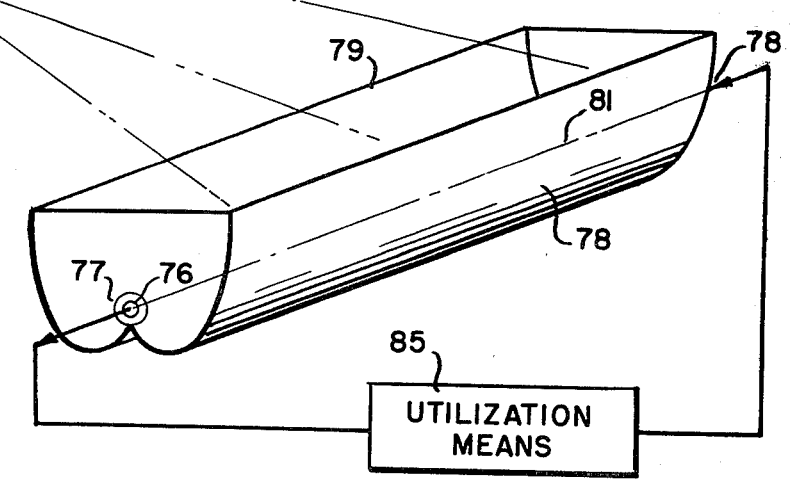
FIG. 4 is a three-dimensional view of a trough-shaped concentration and collection device having the transverse cross sections of FIG. 1, FIG. 2 or FIG. 3.

Referring to FIG. 4, there is shown the three-dimensional representation of a device utilizing the subject designs. The device includes the absorber 76, glazing 77 and reflector walls 78 and 79 which are all extended longitudinally parallel to an axis 81 to form the trough-shaped collector for concentration and collection of radiant energy from a source of radiation such as the sun 83. Utilization means 85 are coupled to the absorber for utilizing the energy absorbed by the absorber.

To understand how these designs actually provide maximum concentration on absorber 10, we observe that the reflector constructed provides ideal concentration on the virtual absorber. Consider FIG. 1. Assume $\phi_1 = \phi_2$. Thus, if the entrance aperture 14 is diffusely illuminated within angular limits $+\theta$ by incident flux $q_i$, the surface of the virtual absorber receives the concentrated flux $$q_f = q_i / \sin \phi \qquad (1)$$

at angles of incidence ranging from 0 to $\pi/2$. Now the portion 23 on top of the actual absorber 10 between tangent portions 27 and 29 coincides with the physical absorber. Moreover, the remainder of the virtual absorber together with the portion 23 form a three-sided enclosure, and one shows by the standard methods of Hottel as described in Chapter 4 of "Radiant Energy Transmission", published in Heat Transmission, Third Edition, edited by W. H. McAdams (McGraw Hill Co., New York, London, 1954), that if the surfaces of lines 26 and 28 emit flux $q_f$, the surface of portion 23 between points 27 and 29 also has flux $q_f$ incident on it.

Thus, the present design provides maximum flux concentration on the physical absorber. This concentrated flux is the same as would be obtained with the ideal reflector design matched to the physical absorber and with no gaps between the reflector and absorber 10. The necessity of introducing a gap between the absorber and the reflector has required the design modifications previously referred to. The subject design will have a larger reflector area than the other designs but will achieve this maximum flux concentration. Although we have shown the case where $\phi_1 = \phi_2$ for clarity, the method is applicable to arbitrary receiver shapes and quite general illumination of the entrance aperture. Moreover, the method may be employed when refractive elements are incorporated since the sole function of the reflecting surface is to insure that extreme (i.e. tangential) meridional rays from the absorber are reflected into the extreme rays incident on the entrance aperture or absorber surface. Thus, it may be desirable to correct the slope of the reflectors 16 and 18 to allow for the aberration caused by the thickness of the glass or transparent envelope of glazing 12 in accordance with the general design procedures.

The disclosed embodiments obey the rule that if light were originating at any angle on the surface of the absorber, it would be led out an entrance aperture with a predetermined angular spread provided a reflector is used which includes an involute portion and a portion which directs incident extreme rays incident on the reflector to the absorber at a predetermined angle of incidence.

The embodiments of the invention in which an exclusive property or privilege is claimed are defined as follows:

1. A cylindrical radiant energy concentration and collection device, comprising: an energy absorber having an exterior surface, a glazing enveloping and spaced from said absorber, and a first reflective wall, said absorber, said glazing and said first wall being aligned parallel to an axis to form a trough-shaped structure, said wall having an ideal contour determined with respect to a virtual absorber shape, said virtual absorber shape having a cross sectional area in a plane perpendicular to said axis defined by the cross sectional area of said absorber in said plane and the additional area defined by the intersection of a first and a second tangent line drawn from a first and a second point respectively along said glazing to be tangent with the exterior surface of said absorber.

2. The device of claim 1 further including a second reflective wall opposed to said first reflective wall, a virtual absorber determinable by the shape of the energy absorber and first and second tangent lines, said second wall having an ideal contour determined with respect to said virtual absorber.

3. The device of claim 2 wherein said absorber is circular in cross section.

4. The device of claim 2 wherein said absorber includes a flat plate with means coupled thereto for removing heat absorbed by the plate.

5. The device of claim 1 wherein said first wall terminates at a second point wherein a line from said first point to said second point is parallel to one of said tangent lines and crosses the optic axis of said device, and wherein said first wall extends beyond said second point with ideal contour of said extension being determined with respect to said first point.

* * * * *